United States Patent
Adams, III et al.

(10) Patent No.: US 7,882,160 B2
(45) Date of Patent: Feb. 1, 2011

(54) LOW LATENCY OPTIMIZATION FOR GENERATIONAL GARBAGE COLLECTION

(75) Inventors: Henry W. Adams, III, Chapel Hill, NC (US); Curtis E. Hrischuk, Holly Springs, NC (US); Ryan A. Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/928,666

(22) Filed: Oct. 30, 2007

(65) Prior Publication Data

US 2009/0112952 A1    Apr. 30, 2009

(51) Int. Cl.
G06F 12/00 (2006.01)
G06F 17/30 (2006.01)
G06F 7/00 (2006.01)
G06F 17/00 (2006.01)

(52) U.S. Cl. .................. 707/819; 707/688; 707/820

(58) Field of Classification Search .......... 707/999.206, 707/688, 819, 820
See application file for complete search history.

(56) References Cited

U.S. PATENT DOCUMENTS

2006/0230087 A1* 10/2006 Andreasson ................ 707/206

OTHER PUBLICATIONS

David F. Bacon , Perry Cheng , David Grove , Martin T. Vechev, Syncopation: generational real-time garbage collection in the metronome, Jun. 15-17, 2005, Proceedings of the 2005 ACM SIGPLAN/SIGBED conference on Languages, compilers, and tools for embedded systems, Chicago, Illinois, USA.*
David Ungar , Frank Jackson, An adaptive tenuring policy for generation scavengers, Jan. 1992, ACM Transactions on Programming Languages and Systems (TOPLAS), v. 14 n. 1, p. 1-27.*

* cited by examiner

*Primary Examiner*—Mohammad Ali
*Assistant Examiner*—Kannan Shanmugasundaram
(74) *Attorney, Agent, or Firm*—Patents on Demand, P.A.; Brian K. Buchheit; Scott M. Garrett

(57) ABSTRACT

A solution for handling objects in a nursery heap that includes a garbage collector monitoring engine, a size adjustor program, and/or a promotion program. The garbage collector monitoring engine can monitor occurrences of global garbage collection events performed by a global garbage collector program as well as occurrences of nursery garbage collection events performed by a nursery garbage collector. The size adjustor program can dynamically adjust a size of a nursery heap based upon programmatically deterministic events detected by the garbage collector monitoring engine. The promotion program can dynamically adjust conditions of promotion for nursery objects, wherein when additional space is needed in the nursery heap to reduce nursery garbage collection induced latency, the promotion program changes promotion criteria to ensure objects are promoted more frequently from the nursery heap.

12 Claims, 5 Drawing Sheets

Listing 240

```
#When a Global GC occurs
numberOfNurseryGc = 0;                    242
endOfGlobalGc = currentTime();

# Too many nursery events in the same second?
if ( ( ++numberOfNurseryGc >= maxNumberOfNurseryGc() ) && ( ( currentTime() - endOfGlobalGC ) < 1000 ms) )

then
        # Major correction needed to avoid multiple GC events in the same second
        # Try to decrease nursery occupancy to increase time from global to nursery GC
        if ( --LifeTimeCounter < 1 )
        then
                LifeTimeCounter = 1;
        fi

# Increase the nursery size
        increaseNurserySizeMajor();           244 elsif ( ( currentTime() - endOfGlobalGC ) < minTimeBetweenGlobalAndNurseryGc() )
then

# Minor correction needed. First try to decrease the object lifetime. If we have reached the end of that adjustment
#then do a minor increase in the nursery size

# Try to decrease nursery occupancy to increase time from global to nursery GC
        if ( --LifeTimeCounter < 1 )
        then
                LifeTimeCounter = 1;
                # Only increase the nursery size by a small amount and increase the occupancy    246
                increaseNurserySizeMinor();
        fi
fi
```

Listing 250

```
# LifeMaxInt represents a maximum time interval an object can spend in a
nursery heap before being promoted to a tenure heap For each object in the Nursery
  LifeTimeCounter = MinNurseryLifeTime / NurseryGcPeriod
  if ( LifeTimeCounter > LifeMaxInt )
  then
        LifeTimeCounter = LifeMaxInt
  fi
End For
```

Listing 260

```
if ( --object.LifeTimeCounter == 0 )
then
        MoveToTenureSpace( object )
fi
```

FIG. 2B

LOW LATENCY OPTIMIZATION FOR GENERATIONAL GARBAGE COLLECTION

BACKGROUND

1. Field of the Invention

The present invention relates to the field of garbage collection during memory management processes and, more particularly, to low latency optimization for generational garbage collection based on dynamic nursery heap adjustment and predicted nursery garbage collections.

2. Description of the Related Art

Virtual machines such as the Java Virtual Machine (JVM) perform garbage collection using a complex set of generational garbage collection algorithms. These algorithms are tuned for best performance in most situations, but in specific situations unwanted latency can result. Garbage collection can refer to a form of memory management that reclaims garbage, or memory used by objects that will never be accessed or mutated again by an application. That is, garbage collection is an alternative to manual memory management that automatically deallocates objects to return associated memory to a system.

When garbage collection tasks are performed, system resources are consumed, which can cause a system to pause or slow down during garbage collection activities. Latency incurred by garbage collection activities can become a problem in latency sensitive situations. For example, latency sensitive protocols, such as Real Time Protocol (RTP) and Session Initiated Protocol (SIP), can experience timeouts due to garbage collection activities. These timeouts can lead to frequent retransmits, failures, and overall poor performance. Because garbage collection is an essential activity to a system, it is necessary to find a solution that does not adversely affect latency sensitive applications.

Currently, generational garbage collection is performed in manner consistent to FIG. 1 (Prior Art). In FIG. 1, a client 110 can execute a SIP capable (or any other) application 112, responsive to SIP messages. Client 110 can include memory space tenure heap 114 and nursery heap 116. Nursery heap 116 is a small area of memory where new objects are created and stored for a short period of time (e.g., one second). Consequently, nursery objects have low life expectancy. Tenure heap 114, however, is a large area of memory where objects live until they are no longer useful. Nursery garbage collector 126 can perform garbage collection several times a second when nursery heap 116 occupancy is high. When an object has survived a pre-determined amount of nursery garbage collections, it is moved to the tenure heap 114. This move from nursery heap 116 to tenure heap 114 is often referred to as promotion. The object will live in the tenure heap 114 until it is no longer needed and is garbage collected by tenure garbage collector 124. Thus, garbage collection occurs in different phases that include a nursery garbage collection phase and global phase for garbage collection. During a global phase the nursery garbage collection algorithm of collector 126 and the tenure garbage collection algorithm of collector 124 can both execute.

Timeline 140 illustrates one scenario wherein client 110 can receive SIP messages for processing and how garbage collection can affect the processing of the SIP messages. At some time during garbage collection AB, new SIP messages 142 can arrive and be queued for processing. At the end of garbage collection AB, the SIP messages 142 can be processed as shown by SIP messages processed 144. Typically, processing will trigger the client 110 to send reply SIP messages to the sender (not shown). Because SIP is a light-weight protocol, SIP messages can arrive immediately after the SIP reply messages have been sent out. As such, new SIP messages 146 illustrate the arrival of more SIP messages required to be processed. At 400 milliseconds, the nursery garbage collector 126 has begun garbage collecting the nursery 116 as shown by CD, leaving new SIP messages 146 unprocessed.

After garbage collection CD has finished, the resultant delay has caused new SIP messages 146 to be retransmitted, as shown by SIP messages retransmitted 148. This retransmission can occur frequently when garbage collection activity is high. As the retransmitted messages 148 arrive, nursery garbage collection EF begins leaving message 148 queued for processing. After garbage collection EF SIP messages 150 can be processed as shown.

SUMMARY OF THE INVENTION

The disclosed solution minimizes nursery inducted latency issues as illustrated in timeline 140. The latency issues occur when a nursery contains too many objects or is too full. One cause of a nursery being too full is that an overall size of the nursery is too small. Another cause it that too many cycles are required to promote nursery objects from a nursery heap to a tenure heap. Both of these causes are resolved by the present solution that for low latency optimization for generational garbage collection based on dynamic nursery heap adjustment and predicted nursery garbage collections.

One embodiment of the solution can include a garbage collector monitoring engine which can monitor global and nursery garbage collection events. A computed value indicating the predicted time between nursery garbage collections can be calculated. This value can be used to approximate object lifetimes, increasing nursery efficiency by decreasing excessive nursery occupancy. Actively promoting nursery objects to tenure space using the calculated life expectancy value decreases the number of nursery garbage collections as well as their duration. Garbage collector monitoring engine can be used to determine when nursery occupancy exceeds a pre-determined threshold and appropriate actions can be taken. One action can include increasing the nursery size by a minor amount, increasing the capacity by a small amount for new objects. Another action can include increasing the nursery size by a major amount, adding significant more heap space to the nursery for objects.

The present invention can be implemented in accordance with numerous aspects consistent with the material presented herein. For instance, one aspect of the present invention can include a method for dynamically decreasing garbage collection induced latency. The method can monitor nursery garbage collection activity after a global garbage collection activity has occurred. A determination can be made as to whether a corrective adjustments to the nursery garbage collection activity is to occur. Corrective adjustments can be indicated by a nursery garbage collection activity exceeding a previously established nursery garbage collection duration (e.g., two hundred and fifty milliseconds), by number of nursery garbage collection events occurring after a last global garbage collection activity exceeds a previously established nursery event threshold (e.g., two nursery garbage collection events occurring within a second of the global garbage collection activity, and/or a number of nursery objects exceeds a previously established occupancy threshold (e.g., fifty percent, etc.). When corrective actions are needed, they can be dynamically and automatically performed. Corrective actions can include decreasing a number of nursery garbage collections an object must survive before it is promoted and/or increasing a size of the nursery garbage collection heap.

Another aspect of the present invention can include a method for promoting objects from a nursery heap to a tenure heap. For each nursery object, recording a creation indictor of a time of creation. When a duration that a nursery object has existed as determined from the creation indicator exceeds a lifetime threshold, the nursery object can be automatically promoted from a nursery heap to a tenure heap. In one embodiment, a utilization percentage of the nursery garbage heap, a time required for a nursery garbage collection activity, and/or a number of nursery garbage collection activities occurring after an occurrence of a global garbage collection activity can be monitored to determine if an adjustment threshold has been exceeded. When an adjustment threshold is exceeded a size of the nursery heap can be increased and/or lifetime thresholds of nursery objects can be decreased.

Still another aspect of the present invention can include a software engine for handling objects in a nursery heap that includes a garbage collector monitoring engine, a size adjustor program, and/or a promotion program. The garbage collector monitoring engine can monitor occurrences of global garbage collection events performed by a global garbage collector program as well as occurrences of nursery garbage collection events performed by a nursery garbage collector. The size adjustor program can dynamically adjust a size of a nursery heap based upon programmatically deterministic events detected by the garbage collector monitoring engine. The promotion program can dynamically adjust conditions of promotion for nursery objects, wherein when additional space is needed in the nursery heap to reduce nursery garbage collection induced latency, the promotion program changes promotion criteria to ensure objects are promoted more frequently from the nursery heap.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 2A and FIG. 2B together represent a schematic diagram illustrating a system for low latency optimization for generational garbage collection based on dynamic nursery heap adjustment and predicted nursery garbage collections in accordance with an embodiment of inventive arrangements disclosed herein.

DETAILED DESCRIPTION OF THE INVENTION

Figure 1:
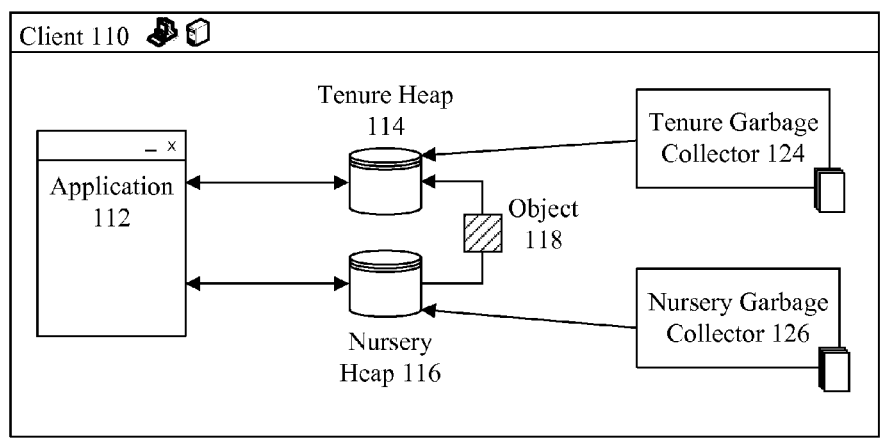
FIG. 1 (Prior Art) is a schematic diagram illustrating a conventional garbage collection approach involving a nursery.
Figure 1:
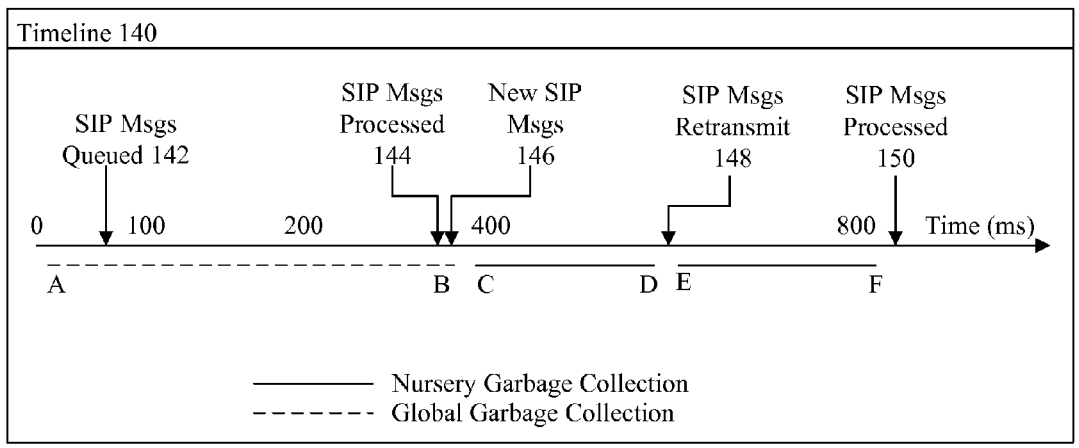
Figure 2A:
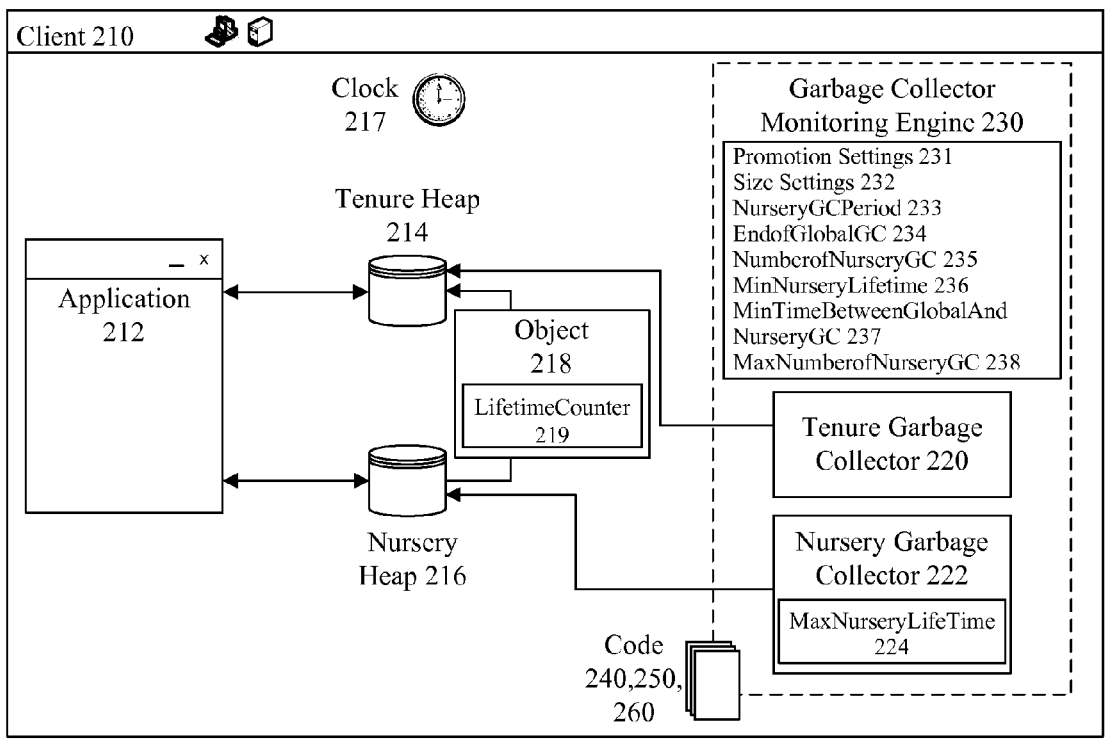

FIG. 2A and FIG. 2B together represent a schematic diagram illustrating a system for low latency optimization for generational garbage collection based on dynamic nursery heap adjustment and predicted nursery garbage collections in accordance with an embodiment of inventive arrangements disclosed herein. In system 200 (FIG. 2A), a client 210 can perform efficient nursery garbage collection with the aid of garbage collector monitoring engine 230. Garbage collector monitoring engine 230 can include program code as shown in listing 240-260 (FIG. 2B), which can improve nursery garbage collection by dynamically adjusting nursery heap size, MaxNurseryLifeTime 224, and object LifeTimeCounter 219. Dynamically changing these settings can reduce excessive nursery garbage collections, especially after a global garbage collection event.

Client 210 can include system clock 217, heap spaces 214, 216, garbage collectors 220, 222, monitoring engine 230 and application 212. Application 212 capable of executing latency sensitive activities can have garbage collection minimized and performance throughput maximized. System clock 217 in concert with monitoring engine 230 can direct nursery garbage collection events to occur only when necessary. Objects 218 used by application 212 can be created in nursery heap 216 and promoted, when appropriate, to tenure heap 214. Promotion can be based on a series of dynamically computed conditions, promotion settings 231, as determined by monitoring engine 230. Promotion settings 231, useful in determining when promotion can occur, can include nursery heap size, frequency of garbage collection, system throughput and the like.

In one embodiment, promotions settings 231 can be based at least in part upon a value of a LifetimeCounter 219. The LifetimeCounter 219 can be a configurable value representing a duration after which the object 218 is to be promoted from the nursery heap 216 to the tenure heap 214. In one embodiment, for example, the LifetimeCounter 219 can indicate that object 218 is to be automatically promoted to the tenure heap 214 after residing in the nursery heap 216 for a configured number of milliseconds. LifetimeCounters 219 can permit an establishment of object 218 specific maximum durations for residing within the heap 216 before promotion to heap 214 automatically occurs.

A global garbage collection phase can involve an execution of the tenure garbage collector 220, which acts against heap 214, and an execution of the nursery garbage collector, which acts against heap 216. Global garbage collection can occur in response to usage conditions of heap 214 and/or clock 217 time values. Nursery garbage collection phases can occur more frequently than global garbage collection phases. Timing for nursery garbage collection phases can be determined by the garbage collector monitoring engine 230 and can be based in part upon a frequency and timing of global garbage collection phase occurrences.

Garbage collector monitoring engine 230 can be capable of observing global and nursery garbage collection events from activities of garbage collectors 220, 222, and can be capable of dynamically adjusting garbage collection settings to optimize performance. Monitoring engine 230 can include promotion settings 231, size settings 232, values 233-236, and functions 237, 238. Monitoring engine 230 can include a class object, set of independent functions and variables, modular plug-in, and the like.

Size settings 232 can include threshold values for adjusting nursery size. These settings can be static, manually adjustable, heuristically adjustable, and the like. Based on empirical data, meaningful values for size settings can be determined and configured. NurseryGcPeriod 233 can be dynamically calculated, wherein the value indicates the predicted time between nursery garbage collection events. Value 233 can be used in conjunction with MinNurseryLifeTime 236 to determine LifetimeCounter 219, as shown in listing 250. LifeTimeCounter 219 can be used to control how quickly objects are promoted out of nursery heap 216 into tenure heap 214, which can reduce nursery garbage collection events and nursery heap 216 occupancy. Promotion of objects can be performed in a manner consistent with listing 260.

EndofGlobalGC 234 can indicate the time, as determined by clock 217, when the last global garbage collection even occurred. This value 234 is utilized to determine the NumberofNurseryGC 235 value. NumberofNurseryGC 235 can be used along with value 234 and MaxNumberofNurseryGC 238 to determine when there are too many nursery events occurring in the same second. When there are too many nursery events, the appropriate action can include decrementing the LifetimeCounter 219 of all objects in the nursery, adjusting MaxNurseryLifeTime 224 value, and increasing the nursery size by employing increaseNurserySizeMajor function. IncreaseNurserySizeMajor function 244 nursery size enlargements, can be controlled via size setting 232, which can be dynamically adjusted at runtime. Function minTimeBetweenNurseryGC 237 can be used to determine when only minor nursery garbage collection adjustment can occur. Minor adjustment to nursery size can be performed using increaseNurserySizeMinor function 246, as shown by 246. Similarly, increaseNurserySizeMinor can obtain appropriate adjustment values from size setting 232.

Listings 240-260 are for illustrative purposes only and should not be construed to limit the invention in any regard. Listing 240-260 can be performed in a variety of languages including, Java, C++, C, and the like.

As presented herein, generational garbage collection algorithms can include, but not limited to, renewal-older-first, younger-first, and the like. In one embodiment, generational garbage collection optimization can occur in a Java Virtual Machine (JVM).

Figure 3:
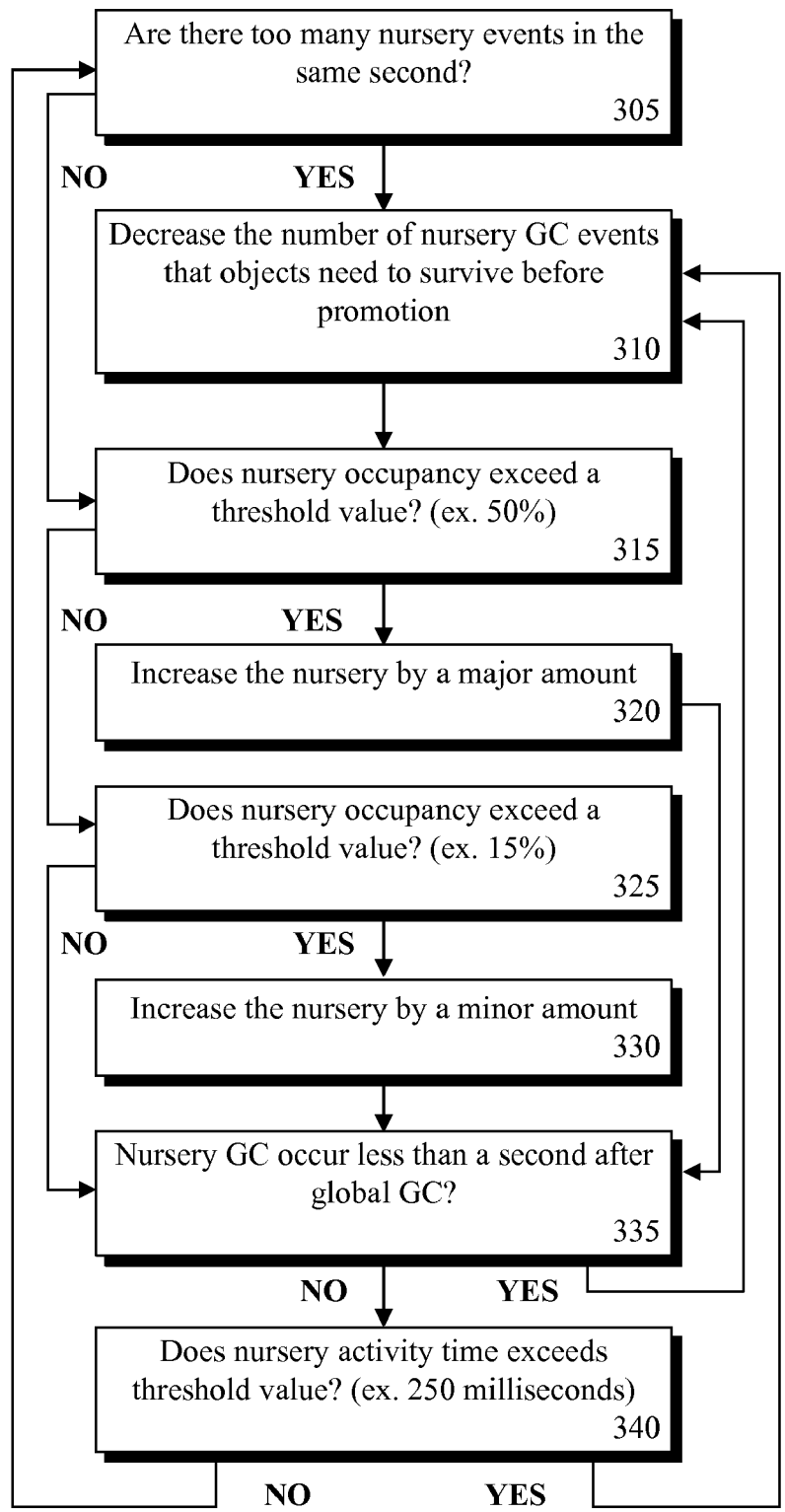
FIG. 3 is a flowchart diagram illustrating a method for low latency optimization for generational garbage collection based on dynamic nursery heap adjustment and predicted nursery garbage collections in accordance with an embodiment of inventive arrangements disclosed herein.

FIG. 3 is a flowchart diagram illustrating a method 300 for low latency optimization for generational garbage collection based on dynamic nursery heap adjustment and predicted nursery garbage collections in accordance with an embodiment of inventive arrangements disclosed herein. Method 300 can be performed in the context of system 200. In method 300, nursery garbage collection events can be optimized to reduce latency when handling latency sensitive applications. Garbage collector monitoring engine 230 can be used to monitor nursery garbage collection events and nursery performance can be tuned appropriately.

In step 305, if there are too many nursery events occurring in the same second, the method can proceed to step 310, else jump to step 315. To reduce excessive nursery events, the number of nursery garbage collection events an object needs to survive before being promoted can be decreased, as shown in step 310. In an alternative implementation (not shown) that bases promotion upon an amount of time spent in a nursery, an amount of time (e.g., LifetimeCounter) an object is to spend in a nursery before automatic promotion can be decreased. In step 315, if the nursery occupancy exceeds a high threshold value (ex. 50%), the method can proceed to 320 where further adjustments can occur, else jump to 325. In step 320, the nursery size can be increased by a major amount in response to high occupancy.

In step 325, if the nursery is determined to be at low occupancy (ex. fifteen percent), the method can proceed to step 330, else jump to 335. In step 330, the nursery heap size can be increased by a small amount to increase efficiency. In step 335, if a nursery garbage collection event has occurred less than a second after global garbage collection, the method can return to step 310, else continue to step 340. In step 340, if the nursery garbage collection time exceeds a pre-determined threshold value (ex. two hundred and fifty milliseconds), the method can return to step 310, else return to step 305.

Figure 4:
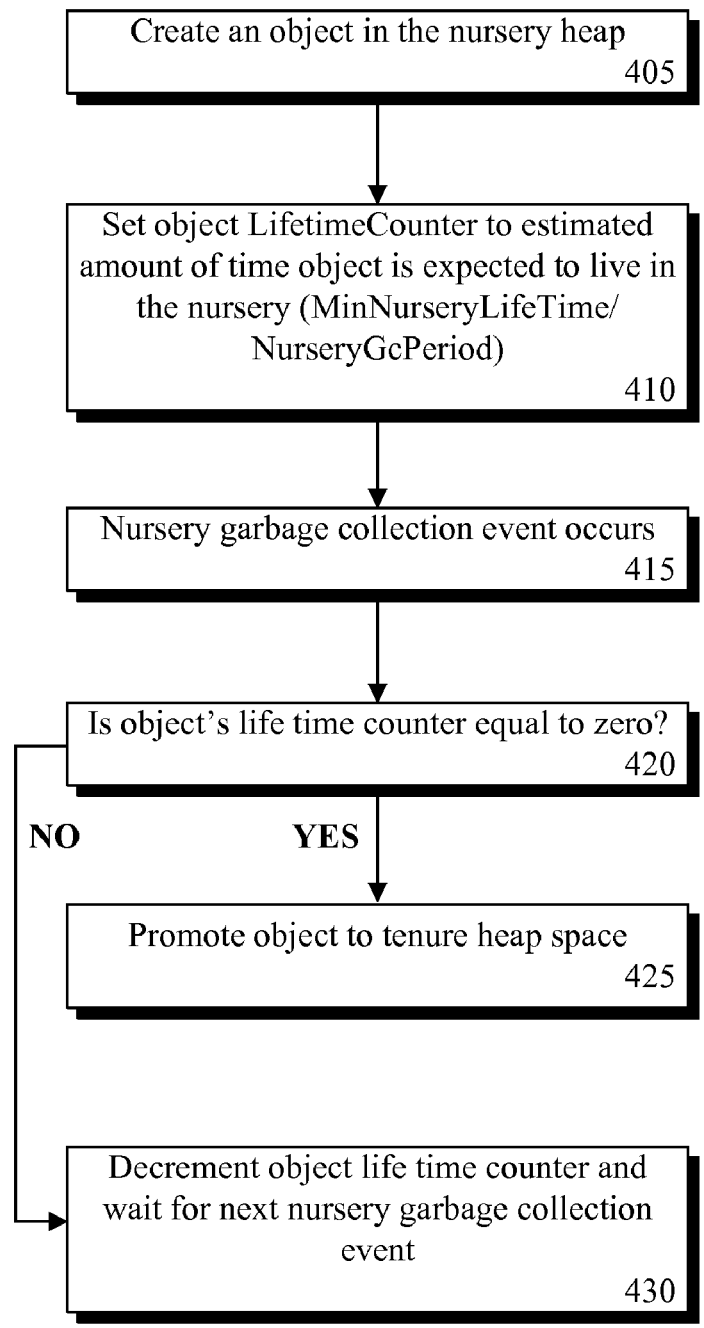
FIG. 4 is a flowchart diagram illustrating a method for using a lifetime counter to determine when nursery objects are to be promoted in accordance with an embodiment of inventive arrangements disclosed herein.

FIG. 4 is a flowchart diagram illustrating a method 400 for using a lifetime counter to determine when nursery objects are to be promoted in accordance with an embodiment of inventive arrangements disclosed herein. Method 400 can be performed in the context of system 200. In method 400, an object creation and subsequent management can be controlled by a predicted lifetime value. In step 405, a new object can be created in the nursery heap. Step 410 can include setting the object's LifetimeCounter to the estimated amount of time the object is expected to live in the nursery. This value can be calculated using two values, MinNurseryLifeTime and NurseryGCPeriod. The MinNurseryLifeTime value can include a user defined setting, default application setting, software agent configuration value, and the like. The Nursery GCPeriod can be a function that can dynamically predict the time between nursery garbage collection events.

In step 415, a nursery garbage collection event can occur. This occurrence is a system controlled event based on nursery occupancy and a system clock 217. In step 420, if the object's lifetime counter is equal to zero then the method can proceed to step 425, else jump to 430. In step 425, the object can be promoted to the tenure heap space and the method can end. In step 430, the object's lifetime counter can be decremented and the object is not considered for promotion to the tenure heap space until the next nursery garbage collection event.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for dynamically decreasing garbage collection induced latency comprising:

establishing a generational garbage collector comprising a nursery heap and a tenure heap, wherein each object of the nursery heap comprises an object specific lifetime counter, said lifetime counter representing an object specific maximum duration for residing in the nursery heap before being automatically promoted to the tenure heap;

monitoring using a software program nursery garbage collection activity after a global garbage collection activity has occurred;

determining using a software program whether a corrective adjustments to the nursery garbage collection activity is to occur, wherein determining step has a positive result when at least one of the following occurs: a nursery garbage collection activity exceeds a previously established nursery garbage collection duration, and number of nursery garbage collection events occurring after a last global garbage collection activity exceeds a previously established nursery event threshold, and a number of nursery objects exceeds a previously established occupancy threshold; and when the determining step has a positive result, performing at least one corrective action using a software program, wherein said at least one corrective action is selected from a group of actions comprising: decreasing a number of nursery garbage collections an object must survive before it is promoted and increasing a size of the nursery garbage collection heap, and categorizing whether a severity level of a needed corrective action, wherein the categorizing severity level comprises a minor level indicating that minor tuning of nursery settings is needed and a major level indicating that major tuning of nursery settings is needed, wherein adjustments performed by the corrective action of the performing step differs based upon the severity level determined by the categorizing step, wherein when the determining step determines multiple nursery garbage collection events occur less than one second after a global garbage collection event, exceeding the established nursery event threshold and categorizing the severity level of the needed correction action as the major level, and wherein when the determining step determines a single nursery garbage collection events occur after a global garbage collection event, exceeding the previously established nursery garbage collection duration and categorizing the severity level of the needed correction action as the minor level, wherein the performed corrective actions are not permitted to negatively affect that each object is to be automatically promoted from the nursery heap to the tenure heap in accordance with that objects lifetime counter value to ensure that a maximum time in the nursery before promotion as specified by the lifetime counter is not exceeded, wherein the lifetime counter is established based on a minimum nursery lifetime counter divided by a predicted nursery garbage collection period, unless the lifetime counter is greater than a lifetime maximum value in which case the lifetime counter is set to the lifetime maximum value, wherein the minimum nursery lifetime counter is a value representing a minimum time any object is permitted to spend in the nursery before promotion, and wherein the lifetime maximum value is a value representing a maximum time any object is permitted to spend in the nursery heap before promotion, wherein determining step has positive results based upon a nursery garbage collection activity exceeding the previously established nursery garbage collection duration.

2. The method of claim 1, wherein the monitoring, determining, and performing steps are automatically and dynamically performed by at least one computing machine executing said software programs, which are stored in a medium that the computing machine is able to read and access.

3. The method of claim 1, further comprising:
determining using a software program that a capacity of a nursery garbage collection heap is being underutilized; and
performing at least one adjustment action using a software program, wherein said at least one adjustment action is selected from a group of actions comprising: increasing a number of nursery garbage collections an object must survive before it is promoted and decreasing a size of the nursery garbage collection heap, wherein the steps of claim 1 and claim 3 are automatically and dynamically performed by at least one computing machine executing said software programs, which are stored in a medium that the at least one computing machine is able to read and access.

4. The method of claim 1, wherein determining step has positive results based upon a number of nursery garbage collection events occurring after a last global garbage collection activity exceeding the previously established nursery event threshold.

5. The method of claim 1, wherein determining step has positive results based upon a detected number of nursery objects exceeding a previously established occupancy threshold.

6. The method of claim 5, wherein a plurality of different previously established occupancy thresholds exist, including a first threshold and a second threshold, wherein said first threshold is greater than said second threshold; wherein when said first threshold is exceeded, the performing of the corrective action decreases the number of nursery garbage collections an object must survive before it is promoted by a first quantity, wherein when said second threshold is exceeded, the performing of the corrective action decreases the number of nursery garbage collections an object must survive before it is promoted by a second quantity, wherein said first quantity is greater than said second quantity.

7. The method of claim 1, wherein the lifetime counter is established based at least in part upon a predicted garbage collection cycle to ensure that at least a portion of the objects are promoted before the garbage collection cycle removes them from the nursery heap.

8. The method of claim 1, wherein the performing step performs the corrective action of decreasing a number of nursery garbage collections an object must survive before it is promoted.

9. The method of claim 1, wherein the performing step performs the corrective action of increasing a size of the nursery garbage collection heap.

10. The method of claim 1, wherein promotion of objects from a nursery heap to a tenure heap is based upon an existence time that the object has existed within the nursery, wherein promotion of objects from the nursery to the tenure heap occur when the existence time exceeds a previously established threshold, wherein existence times are maintained for objects on an object-by-object basis.

11. A computer program product comprising a tangible, non-transitory computer readable storage medium having computer usable program code embodied therewith, wherein the computer usable program code when executed by a processor is operable to:
establish a generational garbage collector comprising a nursery heap and a tenure heap, wherein each object of the nursery heap comprises an object specific lifetime counter, said lifetime counter representing an object specific maximum duration for residing in the nursery heap before being automatically promoted to the tenure heap;

monitor using a software program nursery garbage collection activity after a global garbage collection activity has occurred;

determine using a software program whether a corrective adjustments to the nursery garbage collection activity is to occur, wherein determining step has a positive result when at least one of the following occurs: a nursery garbage collection activity exceeds a previously established nursery garbage collection duration, and number of nursery garbage collection events occurring after a last global garbage collection activity exceeds a previously established nursery event threshold, and a number of nursery objects exceeds a previously established occupancy threshold; and when the determining step has a positive result, perform at least one corrective action using a software program, wherein said at least one corrective action is selected from a group of actions comprising: decreasing a number of nursery garbage collections an object must survive before it is promoted and increasing a size of the nursery garbage collection heap, and categorize whether a severity level of a needed corrective action, wherein the categorizing severity level comprises a minor level indicating that minor tuning of nursery settings is needed and a major level indicating that major tuning of nursery settings is needed, wherein adjustments performed by the corrective action of the performing step differs based upon the severity level determined by the categorizing step, wherein when the determining step determines multiple nursery garbage collection events occur less than one second after a global garbage collection event, exceeding the established nursery event threshold and categorizing the severity level of the needed correction action as the major level, and wherein when the determining step determines a single nursery garbage collection events occur after a global garbage collection event, exceeding the previously established nursery garbage collection duration and categorizing the severity level of the needed correction action as the minor level, wherein the performed corrective actions are not permitted to negatively affect that each object is to be automatically promoted from the nursery heap to the tenure heap in accordance with that objects lifetime counter value to ensure that a maximum time in the nursery before promotion as specified by the lifetime counter is not exceeded, wherein the lifetime counter is established based on a minimum nursery lifetime counter divided by a predicted nursery garbage collection period, unless the lifetime counter is greater than a lifetime maximum value in which case the lifetime counter is set to the lifetime maximum value, wherein the minimum nursery lifetime counter is a value representing a minimum time any object is permitted to spend in the nursery before promotion, and wherein the lifetime maximum value is a value representing a maximum time any object is permitted to spend in the nursery heap before promotion, wherein determining step has positive results based upon a nursery garbage collection activity exceeding the previously established nursery garbage collection duration.

12. A system for dynamically decreasing garbage collection induced latency comprising:

a processor;

a non-transitory memory; and a bus connecting said processor, non-transitory memory, and non-transitory memory to each other, wherein the non-transitory memory comprises computer usable program code executable by said processor, which when executed:

establishes a generational garbage collector comprising a nursery heap and a tenure heap, wherein each object of the nursery heap comprises an object specific lifetime counter, said lifetime counter representing an object specific maximum duration for residing in the nursery heap before being automatically promoted to the tenure heap;

monitors using a software program nursery garbage collection activity after a global garbage collection activity has occurred;

determining using a software program whether a corrective adjustments to the nursery garbage collection activity is to occur, wherein determining step has a positive result when at least one of the following occurs: a nursery garbage collection activity exceeds a previously established nursery garbage collection duration, and number of nursery garbage collection events occurring after a last global garbage collection activity exceeds a previously established nursery event threshold, and a number of nursery objects exceeds a previously established occupancy threshold; and when the determining step has a positive result, performs at least one corrective action using a software program, wherein said at least one corrective action is selected from a group of actions comprising: decreasing a number of nursery garbage collections an object must survive before it is promoted and increasing a size of the nursery garbage collection heap, and categorizes whether a severity level of a needed corrective action, wherein the categorizing severity level comprises a minor level indicating that minor tuning of nursery settings is needed and a major level indicating that major tuning of nursery settings is needed, wherein adjustments performed by the corrective action of the performing step differs based upon the severity level determined by the categorizing step, wherein when the determining step determines multiple nursery garbage collection events occur less than one second after a global garbage collection event, exceeding the established nursery event threshold and categorizing the severity level of the needed correction action as the major level, and wherein when the determining step determines a single nursery garbage collection events occur after a global garbage collection event, exceeding the previously established nursery garbage collection duration and categorizing the severity level of the needed correction action as the minor level, wherein the performed corrective actions are not permitted to negatively affect that each object is to be automatically promoted from the nursery heap to the tenure heap in accordance with that objects lifetime counter value to ensure that a maximum time in the nursery before promotion as specified by the lifetime counter is not exceeded, wherein the lifetime counter is established based on a minimum nursery lifetime counter divided by a predicted nursery garbage collection period, unless the lifetime counter is greater than a lifetime maximum value in which case the lifetime counter is set to the lifetime maximum value, wherein the minimum nursery lifetime counter is a value representing a minimum time any object is permitted to spend in the nursery before promotion, and wherein the lifetime maximum value is a value representing a maximum time any object is permitted to spend in the nursery heap before promotion, wherein determining step has positive results based upon a nursery garbage collection activity exceeding the previously established nursery garbage collection duration.

* * * * *